Sept. 11, 1928.  
J. W. RICHARDS, JR  
1,683,806  
SHOE FOR TRANSMISSION CLUTCH DRUM LUGS  
Filed March 20, 1926
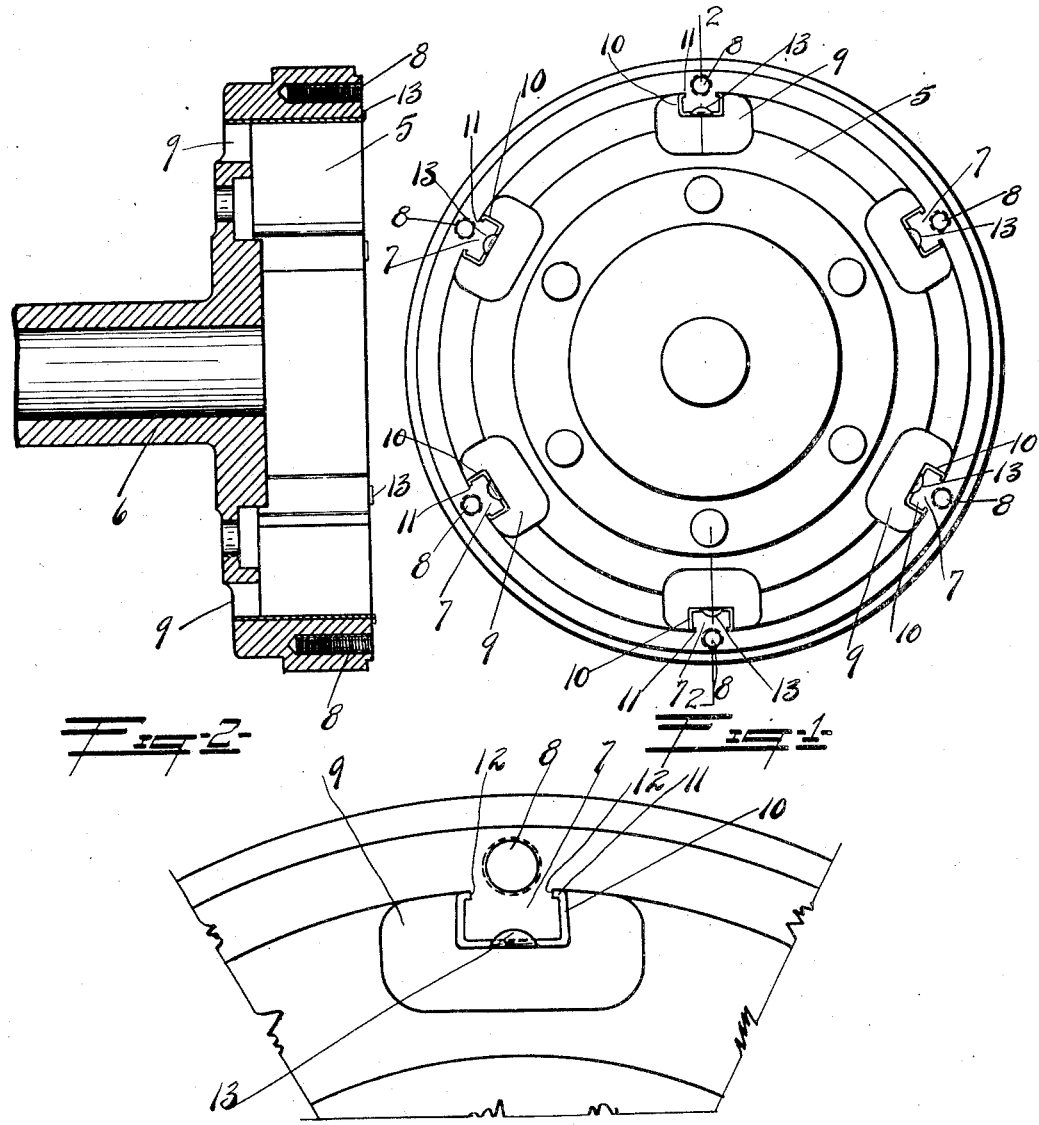
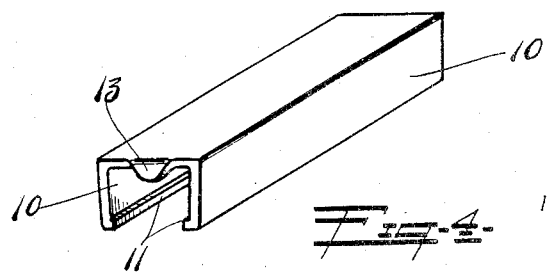
INVENTOR.  
John W. Richards, Jr  
BY Hank C. Furman.  
ATTORNEY.

Patented Sept. 11, 1928.

1,683,806

UNITED STATES PATENT OFFICE.

JOHN W. RICHARDS, JR., OF ESSEXVILLE, MICHIGAN.

SHOE FOR TRANSMISSION-CLUTCH-DRUM LUGS.

Application filed March 20, 1926. Serial No. 96,185.

This invention relates to transmission clutch drum shoes, and particularly to a hardened steel shoe adapted to fit over the drum lugs for engagement by the clutch discs.

The prime object of the invention is to design a steel shoe adapted to fit the clutch drum lugs in the transmission of a Ford automobile, and which will absorb the wear which would otherwise be taken by the lugs, and prevent scoring and cutting of the bosses on the high speed clutch drum assembly.

Another object is to design a very simple steel shoe, economical to manufacture, and easy the fit in position.

A further object is to design a steel shoe for application to the clutch drum lugs, which will, by eliminating wear on the lugs proper, allow free high speed plate action, greater high speed thrust bearing, and which will eliminate slippage and loss of power in high speed or direct drive.

A still further object is to design a hardened steel shoe for clutch drum lugs which will give adequate high speed clutch disc plate assembly release, when the vehicle transmission is in neutral position, which action minimizes and practically eliminates the possibility of the vehicle starting ahead when the vehicle engine is being started with the transmission in neutral position, and which frequently occurs in cold weather conditions due to the congealing of the oil on the disc plates, and when the disc plate assembly is not properly released due to the plates hanging in the scored surfaces of the lugs.

The above and other objects will appear as the specification progresses, reference being had to the accompanying drawing in which I have shown the preferred embodiment of my invention, and in which like reference numerals indicate like parts throughout the several views thereof.

In the drawing—

Fig. 1 is a front view showing the interior of the transmission clutch drum with the steel shoes in position.

Fig. 2 is a vertical sectional view thereof taken on the line 2—2 of Fig. 1.

Fig. 3 is an enlarged fragmentary view of the drum showing my hardened steel shoe in position.

Fig. 4 is an isometric view of one of the steel shoes.

Referring now to the drawing, the numeral 5 indicates a transmission clutch drum such as used on the commercially named Ford automobile. This is preferably a casting having a hub 6 cast integral therewith and projecting laterally therefrom, and which is bored to receive a gear sleeve bushing (not shown) in the usual manner.

A plurality of lugs 7 are cast on the interior of the clutch drum in spaced apart relation, and threaded openings 8 are provided directly adjacent the lugs and are adapted to receive the cap screws (not shown) and by means of which the transmission driving plate is secured in position. Openings 9 are cored in the clutch drum in the position as shown, to allow the lugs 7 to be machined, and for the placing of the steel shoes in position thereon.

The clutch drum is of the standard design used on the vehicle above described, and I do not deem it necessary to describe this in detail, as this invention is directed to the hardened steel shoes for absorbing the clutch disc wear on the lugs above referred to.

This steel shoe is preferably a stamping, channel shaped to fit over the lugs as shown, the legs 10 being turned as shown at 11 to fit scored grooves 12 provided in the sides of the lug, one end of the shoe being provided with a downwardly turned lip 13 to limit and prevent the shoe slipping through and out the other side of the clutch drum when assembled, the legs 10 being preferably bent slightly inwardly so that they will spring into position and resiliently grip the side of the lug.

As above mentioned the shoe is designed to protect the lug 7 and absorb the wear which is normally directed on the lugs, and while in the present instance I have shown the legs 10 slightly turned, and a lip 13 for fastening the shoe in position, this is for illustration purposes only, as it will be readily understood that various other fastening means may be employed such as shaping the shoe differently, or by using other independent means for holding it in position.

The shoe can be stamped from a continuous strip of metal and hardened after being formed to proper shape, is very cheap; easy to apply, and will eliminate the objectionable scoring of the lugs, which in turn prevents proper disc plate release.

From the foregoing description it will be obvious that I have perfected a simple, practical and economical shoe for absorbing the wear normally directed on the transmission clutch drum lugs.

What I claim is:—

1. A channel shaped hardened steel shoe adapted to be detachably secured to a lug of a transmission clutch drum.

2. A hardened steel shoe U-shaped in cross-section and adapted to fit a lug of a transmission clutch drum, and means for holding said shoe in position.

3. A hardened steel shoe U-shaped in cross-section adapted to be detachably secured to a lug of a transmission clutch drum, and means for holding said shoe in position.

4. A hardened channel shaped steel shoe adapted to resiliently engage a lug of a transmission clutch drum, and means on the shoe to prevent longitudinal movement thereof when in position.

In testimony whereof I hereunto affix my signature.

JOHN W. RICHARDS, Jr.